United States Patent [19]

Traas

[11] Patent Number: 4,921,636
[45] Date of Patent: May 1, 1990

[54] TIME DURATION INDICATOR SYSTEMS, AND ALSO PRODUCTS CONTAINING SUCH INDICATOR SYSTEMS HAVING A LIMITED DURATION OF USE OR LIFE

[75] Inventor: Petrus C. Traas, Naarden, Netherlands

[73] Assignee: Naarden International N.V., Naarden-Bussum, Netherlands

[21] Appl. No.: 939,521

[22] Filed: Dec. 3, 1986

[30] Foreign Application Priority Data

Dec. 16, 1985 [NL] Netherlands ............ 8503456

[51] Int. Cl.$^5$ ............................................. B66D 3/04
[52] U.S. Cl. ..................... 252/408.1; 239/6; 239/35; 239/54; 239/60
[58] Field of Search ........... 252/408.1; 239/6, 35, 239/44, 54, 56, 58, 60; 116/206

[56] References Cited

U.S. PATENT DOCUMENTS

| | | | |
|---|---|---|---|
| 2,251,058 | 7/1941 | Kirkman | 239/60 X |
| 3,018,611 | 1/1962 | Biritz | 116/206 X |
| 4,157,787 | 6/1979 | Schwartz | 239/60 X |
| 4,248,597 | 3/1981 | McNeely | 116/206 |
| 4,356,969 | 11/1982 | Obermayer et al. | 239/60 X |
| 4,408,557 | 10/1983 | Bradley et al. | 116/206 |
| 4,550,676 | 11/1985 | Francis | 252/408.1 X |
| 4,583,686 | 4/1986 | Martens et al. | 239/35 |
| 4,629,330 | 12/1986 | Nichols | 368/89 |
| 4,643,122 | 2/1987 | Seybold | 252/408.1 X |

FOREIGN PATENT DOCUMENTS 1240474 5/1967 Fed. Rep. of Germany.
1169887 11/1969 United Kingdom.

*Primary Examiner*—John F. Terapane
*Assistant Examiner*—Philip Tucker
*Attorney, Agent, or Firm*—Brumbaugh, Graves, Donohue & Raymond

[57] ABSTRACT

Time duration indicator systems comprising a porous inert carrier and a volatile liquid, capable of reversibly changing the visual properties of the carrier. Such indicator systems can be used for products having a limited duration of use or life.

10 Claims, 1 Drawing Sheet

U.S. Patent
May 1, 1990
4,921,636
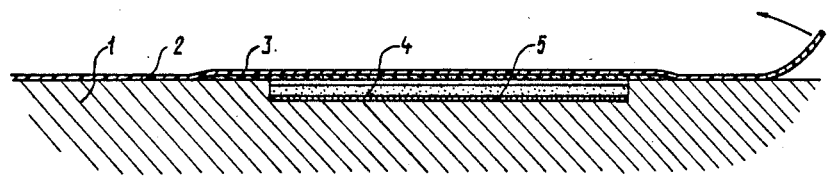
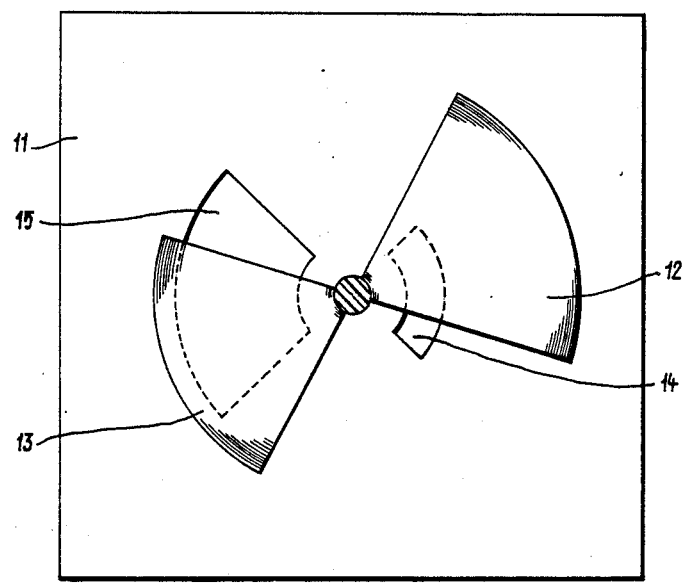

TIME DURATION INDICATOR SYSTEMS, AND ALSO PRODUCTS CONTAINING SUCH INDICATOR SYSTEMS HAVING A LIMITED DURATION OF USE OR LIFE

The invention relates to indicator systems which indicate the end of a predetermined time duration and also to products with a limited duration of use or life which contain such time duration indicator systems. More particularly, the invention relates to indicator systems for once-only use which, in the case of a product with a limited duration of life, indicate when said life has come to an end.

BACKGROUND OF THE INVENTION

In the case of many products with a limited duration of life it is not possible, or barely possible, for the consumer to detect when said duration of life has come to an end and there is therefore no purpose in making further use of the product.

The end of said duration of life cannot be indicated by printing on a date during the production since the duration of life only begins at the moment when the consumer actually starts to use the product. In such cases there is a need for an indicator system which is activated at the moment the product is put into use, and which undergoes a clearly visible change at the end of the duration of life.

Other products have a limited durability from the moment of production. In these cases a final date of use is generally indicated on the packaging. Said date is often difficult for the consumer to find or poorly legible. In these cases too, an eye-catching indicator could be used with advantage.

Typical examples of products with a limited duration of life from the moment they are put into use by the consumer are so-called air-treatment products. Such products are intended to disperse one or more volatile components, such as perfumes, deodorant components, insecticides, pheromones or repellants in the atmosphere by evaporation. If perfumes or deodorant components are involved, said air-treatment products are usually termed air fresheners.

Indicator systems specially intended for airfreshener systems are, for example, described in the U.S. Pat. No. 4,128,508 and the Japanese Patent applications Nos. 56,053,461 and 56,131,681. These are based on the change in colour of a pH indicator combined with a slowly evaporating acid or base. Such systems have the disadvantage that the choice of suitable volatile acids and bases is limited, inter alia, because they often have a strong and usually undesirable smell of their own. Furthermore, many are not completely harmless to health and, in addition, volatile acids may have a corrosive effect on metals in the surroundings. Other colour indicator systems, which are described in the Japanese Patent application No. 55,027,200, are based on the slow oxidation or reduction of organic pigments by added oxidation or reduction agents respectively, or by atmospheric oxygen. Such systems have hitherto only proved suitable for adding to, for example, shampoo, depilitories, toothpastes and the like in order to indicate action times from a few minutes to a few tens of minutes. For products with a duration of life of a few days to a few months, such systems are completely unsuitable.

SUMMARY OF THE INVENTION

It has now been found that duration-of-life indicators which function effectively can be manufactured by impregnating a porous material, hereinafter termed the "carrier", with a volatile liquid, as a result of which a visible change occurs in the visual properties of the carrier. As a result of evaporation of the volatile impregnating liquid, the original visual properties of the carrier return again after the expiry of a certain time. The time lapse between the beginning of the evaporation and the return of the original properties, hereinafter termed the "indication duration" is therefore chosen in such a manner that it coincides with the duration of life of the product to which the indicator is attached.

BRIEF DESCRIPTION OF THE DRAWINGS

FIG. 1 shows a time duration indicator according to an embodiment of the claimed invention.

FIG. 2 shows an air treatment product including a time duration indicator according to the claimed invention.

DETAILED DESCRIPTION OF THE INVENTION

The change in the visual properties of the carrier can be achieved in various ways. Thus, a transparent porous carrier material can be impregnated with a coloured volatile liquid in a manner such that the carrier remains transparent but acquires a different colour. As a result of the evaporation of the coloured liquid, the original colour of the carrier returns after expiry of the indication duration. A clear carrier material can also be impregnated with a volatile liquid, whether coloured or not, such that the carrier becomes cloudy. In that case the change in the indicator is indicated by the carrier becoming clear again, which may or may not be combined with the alteration of the colour.

Finally, a carrier material which diffusely reflects light in a dry state can be impregnated with a volatile liquid, whether coloured or not, as a result of which the carrier, which was previously not translucent or only slightly translucent, becomes translucent. In this last case the change in the indicator is indicated by the carrier becoming (almost) opaque again, which may or may not be combined with the alteration of the colour.

The indication duration is determined, inter alia, by the quantity of volatile liquid which is available for evaporation. At the same time this does not need to be limited to the quantity which can be absorbed by the carrier. It is also possible to use a reservoir containing volatile liquid with which the carrier makes contact and from which liquid can be taken up by capillary action. In this manner, a longer indication time can be achieved than would be possible with the quantity of liquid absorbed in the carrier only. Furthermore, the indication duration is determined by the volatility of the liquid and, in particular, in a manner such that a higher volatility leads to a shorter indication duration. The same applies to an increase in the evaporating surface of the carrier.

Finally, the indication duration can be very accurately regulated by covering the carrier impregnated with volatile liquid, with a polymer film which is permeable to the vapour of the volatile liquid. Provided other conditions remain the same, the degree of permeability of a chosen film to the vapour of a chosen liquid determines the rate of evaporation and, consequently, the indication duration. In its turn, permeability is determined by the thickness of the film, the nature of the polymer and the nature of the liquid. If said film is situated on the observer's side of the indicator, it must, of course, be sufficiently transparent in order for it to be possible to detect the change in the indicator which indicates the end of the duration of life.

The change in the visual properties of the impregnated carrier and, consequently, the change in the indicator, can be detected both by transmitted and by incident light. In the first case a translucent layer in a colour differing from that of the carrier material and/or the impregnating liquid is preferably provided behind the carrier, as a result of which the change in the indicator from cloudy to clear or from translucent to opaque is accompanied by a change in colour. The initial and final colour can be chosen as desired by optionally colouring the carrier material itself. Even if the indicator is intended to be used with incident light, it is advisable to provide the carrier with a coloured layer on the side facing away from the observer, which coloured layer can be observed through the carrier in the clear or translucent state of the carrier and cannot be, or virtually cannot be, observed in the cloudy or opaque state. In this latter state only, or principally, the carrier itself is observable. If incident light is used, however, the coloured layer does not need to be translucent, but a fluorescent or strongly reflecting material is preferably chosen so that as good use as possible is made of the quantity of instant light. Such a coloured layer may, for example, consist of fluorescent paint or paper, glass, metal, plastic or another material coated with such paint. Said paint must not be soluble in the volatile liquid. Finally, it is also possible to mix a carrier, which is opaque in the dry state, homogeneously with a colourant. Such a carrier is very clearly and detectably coloured in the impregnated state, but during the change the colour largely disappears before the eye and only a slightly coloured carrier remains behind.

The assessment of whether the indicator has or has not changed can be appreciably simplified by providing an object with the same exterior as the indicator after change in the immediate vicinity of the indicator for comparison.

For this purpose, for example, the same indicator may be used from which the volatile liquid has been omitted. It is also possible to give the wrapping of the product to be indicated the colour of the indicator after change so that the latter does in fact stand out from its surroundings before change, but no longer does so after change.

The change in the indicator usually occurs even before 100% evaporation of the volatile liquid has taken place. The residual quantity which is still left after the change, depends on the specific design of the indicator and the materials used in it, but is independent of the quantity of liquid at the beginning of the indication duration provided the latter exceeds the residual quantity.

The residual quantity is simple to determine experimentally by weighing the indicator before impregnation with liquid and shortly after complete change. It is constant for a combination of a chosen embodiment of the indicator and a chosen liquid. For a chosen embodiment and liquid, the indication duration is approximately directly proportional to the quantity of liquid.

Many different materials are suitable for acting as a carrier material for the indicator. For the indicator systems which are based on the principle that an opaque carrier becomes translucent by impregnation with volatile liquid and becomes opaque again by evaporation, for example, paper, textiles, felt-type materials, porous, non-transparent polymers, porous ceramic materials, powders, whether compacted or not, bonded or sintered, such as synthetic or natural polymer powders, silica gel, aluminum oxide and the like are suitable.

In order to be satisfactorily translucent in the impregnated state, a thin layer of carrier material should be used. In the use of uniformly coloured carriers, however, in which the change is based on the colour difference in the carrier itself in the impregnated and in the dry state, thick layers or carriers in the form of pills or tablets may also be used.

For the indicator systems, which are based on the principle that a clear carrier material becomes cloudy and/or changes colour on impregnating with a liquid and, after evaporation of the liquid regains its original colour again and/or becomes clear again, clear porous polymers are primarily very suitable.

Many types of volatile liquids are likewise suitable for acting as an impregnating liquid. Here the term "volatile liquid" is used to mean a liquid with a volatility Such that, after being applied to a carrier, it has evaporated within a year at 20° C. The volatile liquid to be used should be harmless to health and not have any undesired smell in the concentrations released during evaporation from the indicator.

Furthermore, the carrier and the polymer covering film optionally to be provided must not dissolve in the liquid or react with it.

Suitable liquids may be, for example, water, alcohols, diols, polyols and low-molecular polymers thereof, such as polyethylene glycols, polypropylene glycols, copolymers thereof and ethers derived therefrom, other single and multiple ethers, ketones, aldehydes, nitriles, esters etc. Such liquids are known, for example, as industrial solvents or raw materials.

Covering film which is permeable to vapour and suitable for regulating the rate of evaporation of the volatile liquid may be of natural, semisynthetic or synthetic origin. Very suitable, for example, are polyethylene, polypropylene, ethylene/vinyl acetate copolymer, polyvinyl chloride, and polyurethane films.

If the indicator is intended to indicate the duration of life of a product from the moment it is put into use by the consumer, the packaging of the indicator should be impermeable to the vapour of the volatile liquid. In a preferably used embodiment of the indicator a small disc of impregnated carrier is completely wrapped in a packaging material which is not permeable to vapour, for example a thin metal foil or plastic material which is not permeable to vapour, whereafter, when the indicator is put into use, said packaging material is completely or partially removed on at least one side, preferably in one operation with the removal of the packaging of the product to be indicated. An example of an indicator constructed in this way is shoen in FIG. 1 in which (1) represents a product with limited duration of life, (2) a packaging material which is impermeable to vapour, (3) a film which is permeable to vapour, (4) an impregnated carrier and (5) a coloured and/or reflecting layer.

The indicator systems described above are especially suitable for indicating the duration of life of air-treatment products such as air fresheners and insecticide spreaders, in which the active component is released to the atmosphere by evaporation from a carrier material. Said carrier material may be of a completely different type to the carrier material which is used for the life duration indicator. The duration of life of such air-treatment products may be considerably affected by external factors, such as the ambient temperature, the degree of ventilation and the degree of humidity of the room in which the product is set up, and the presence of air currents flowing past the products.

Since the action of such products and of the way of the life duration indicator according to the invention are based on the same principle, said external factors affect the duration of life of the preparation and the indication duration of the indicator in a corresponding manner, as a result of which a precise indication of the duration of life is obtained under varying circumstances.

Some air-treatment products are provided with a packaging with a variable opening, with which the rate of evaporation of the active components can be regulated. By also providing the space in which the life duration indicator is situated with such a variable opening and coupling the mechanisms for opening and closing the two openings together, the precise indication duration can also be obtained for said products. An example of such a system is shown in FIG. 2, in which (11) represents a container of the air-treatment product (front view), (12) and (13) represent rotatable segments on a single spindle, (14) represents an opening behind which the life duration indicator is situated, and (15) represents an evaporation opening for the air-treatment product. It will be clear to those skilled in the art, that many different embodiments are conceivable for such systems.

Many air-treatment products consist of a porous carrier from which the active components are released by evaporation. In such cases it is possible in principle to make the entire air-treatment product itself, or in part thereof, act as a life duration indicator, for example by providing a coloured layer at the back as been described above, the colour bring visible through the product during the duration of life. In practice it is often more expedient to provide a separately manufactured duration of life indicator.

The following examples serve to illustrate the principle of the invention and some possible applications. The invention is, however, not limited thereto.

EXAMPLE I

The effect of a number of covering films on the rate of evaporation of various volatile liquids was investigated. For this purpose, a carrier consisting of a small sheet of porous polypropylene film with an area of 25 cm$^2$ and 163 $\mu$m thick and having a 75% pore volume was impregnated with 0.3 g of liquid and covered with one of the following vapour-permeable films:
(A) Polyurethane film, type PS 8010:thickness: 100 $\mu$m
(B) As above:thickness : 225 $\mu$m
(C) Ethylene/vinyl acetate copolymer film, type H-4/M 1436 thickness: 80 $\mu$m
(D) Polyvinyl chloride film, type MTAS: thickness: 100 $\mu$m
(E) As above:thickness: 150 $\mu$m
(F) As above:thickness: 200 $\mu$m
(G) Polyvinyl chloride film, type DTAS:thickness: 90 $\mu$m
(H) As above:thickness: 120 $\mu$m
(I) As above:thickness: 170 $\mu$m The films A and B are marketed by Deerfield Urethane Co., South Deerfield, USA; film C by Plate Nederland, Soest; films D to I incl. by Draka, Amsterdam/Enkhuizen; the porous polypropylene film type accurel by Enka, Obernburg, West Germany.

The evaporation (at 21° C. and a relative humidity of 45%) was tracked by measuring the decrease in weight as a consequence of evaporation 3 days after impregnation and subsequently at intervals of 5 days. As a comparison, the evaporation from the same uncovered carrier was determined under the same conditions.

The results have been summarized in the table below for the volatile liquids mentioned therein. The decrease in weight is specified as a percentage of the original quantity of liquid.

| Effects of various types of film on evaporation HEXANOL | | | | | |
|---|---|---|---|---|---|
| | % evaporation after | | | | |
| Film | 3 days | 8 days | 13 days | 18 days | 23 days |
| A | 49 | 94 | 100 | 100 | 100 |
| B | 13 | 47 | 75 | 93 | 100 |
| C | 93 | 100 | 100 | 100 | 100 |
| D | 22 | 44 | 60 | 72 | 81 |
| E | 11 | 35 | 52 | 68 | 79 |
| F | 10 | 33 | 51 | 63 | 70 |
| G | 3 | 6 | 12 | 16 | 18 |
| H | 0 | 1 | 4 | 6 | 10 |
| I | 0 | 0 | 0 | 4 | 7 |
| none | 100 | 100 | 100 | 100 | 100 |

| HEPTANOL | | | | | |
|---|---|---|---|---|---|
| | % evaporation after | | | | |
| Film | 3 days | 8 days | 13 days | 18 days | 23 days |
| A | 40 | 100 | 100 | 100 | 100 |
| B | 6 | 35 | 62 | 86 | 93 |
| C | 96 | 100 | 100 | 100 | 100 |
| D | 18 | 46 | 62 | 74 | 84 |
| E | 11 | 32 | 48 | 63 | 69 |
| F | 6 | 29 | 47 | 61 | 67 |
| G | 1 | 10 | 18 | 24 | 29 |
| H | 0 | 6 | 11 | 15 | 16 |
| I | 0 | 0 | 0 | 4 | 7 |
| none | 100 | 100 | 100 | 100 | 100 |

| OCTANOL | | | | | |
|---|---|---|---|---|---|
| | % evaporation after | | | | |
| Film | 3 days | 8 days | 13 days | 18 days | 23 days |
| A | 19 | 47 | 84 | 92 | 92 |
| B | 1 | 18 | 34 | 51 | 68 |
| C | 65 | 100 | 100 | 100 | 100 |
| D | 5 | 27 | 39 | 54 | 61 |
| E | 5 | 25 | 35 | 45 | 55 |
| F | 2 | 20 | 29 | 38 | 46 |
| G | 1 | 4 | 5 | 9 | 10 |
| H | 0 | 0 | 1 | 4 | 5 |
| I | 0 | 0 | 0 | 1 | 3 |
| none | 100 | 100 | 100 | 100 | 100 |

| NONANOL | | | | | |
|---|---|---|---|---|---|
| | % evaporation after | | | | |
| Film | 3 days | 8 days | 13 days | 18 days | 23 days |
| A | 4 | 16 | 27 | 39 | 43 |
| B | 0 | 8 | 18 | 27 | 36 |
| C | 20 | 65 | 97 | 100 | 100 |
| D | 5 | 21 | 31 | 40 | 45 |
| E | 4 | 15 | 21 | 30 | 37 |
| F | 0 | 10 | 15 | 23 | 30 |
| G | 0 | 0 | 3 | 6 | 10 |

-continued

NONANOL

| Film | % evaporation after | | | | |
|------|--------|--------|---------|---------|---------|
|      | 3 days | 8 days | 13 days | 18 days | 23 days |
| H    | 0      | 0      | 2       | 3       | 5       |
| I    | 0      | 0      | 0       | 2       | 5       |
| none | 29     | 95     | 100     | 100     | 100     |

DECANOL

| Film | % evaporation after | | | | |
|------|--------|--------|---------|---------|---------|
|      | 3 days | 8 days | 13 days | 18 days | 23 days |
| A    | 85     | 98     | 100     | 100     | 100     |
| B    | 0      | 1      | 3       | 8       | 12      |
| C    | 17     | 54     | 90      | 100     | 100     |
| D    | 38     | 87     | 100     | 100     | 100     |
| E    | 29     | 65     | 93      | 100     | 100     |
| F    | 26     | 56     | 86      | 90      | 93      |
| G    | 19     | 61     | 87      | 100     | 100     |
| H    | 15     | 43     | 74      | 87      | 89      |
| I    | 11     | 39     | 66      | 79      | 85      |
| none | 100    | 100    | 100     | 100     | 100     |

DIETHYLENE GLYCOL MONOETHYL ETHER

| Film | % evaporation after | | | | |
|------|--------|--------|---------|---------|---------|
|      | 3 days | 8 days | 13 days | 18 days | 23 days |
| A    | 77     | 100    | 100     | 100     | 100     |
| B    | 25     | 75     | 85      | 89      | 91      |
| C    | 19     | 60     | 95      | 100     | 100     |
| D    | 40     | 91     | 100     | 100     | 100     |
| E    | 31     | 79     | 94      | 97      | 100     |
| F    | 27     | 70     | 92      | 96      | 100     |
| G    | 18     | 54     | 85      | 92      | 94      |
| H    | 18     | 46     | 76      | 86      | 92      |
| I    | 13     | 38     | 64      | 82      | 86      |
| none | 100    | 100    | 100     | 100     | 100     |

ISOBORNYL ACETATE

| Film | % evaporation after | | | | |
|------|--------|--------|---------|---------|---------|
|      | 3 days | 8 days | 13 days | 18 days | 23 days |
| A    | 2      | 16     | 24      | 33      | 47      |
| B    | 0      | 0      | 4       | 8       | 12      |
| C    | 77     | 96     | 98      | 98      | 98      |
| D    | 58     | 77     | 82      | 86      | 89      |
| E    | 44     | 65     | 70      | 75      | 80      |
| F    | 21     | 45     | 54      | 58      | 63      |
| G    | 31     | 54     | 59      | 63      | 67      |
| H    | 8      | 44     | 50      | 54      | 58      |
| I    | 0      | 22     | 32      | 38      | 43      |
| none | 100    | 100    | 100     | 100     | 100     |

EXAMPLE II

The indication duration of indicators consisting of a carrier of porous polypropylene film described in Example I having an area of 0.4 cm$^2$ and coated on the reverse side with fluorescent paint was determined. Each carrier was impregnated with approximately 0.05 ml of volatile liquid. The indication duration was determined at room temperature. The impregnated carriers were not covered with a polymer film.

The table below lists the volatile liquids used, followed by the indication duration obtained. The figures obtained are not intended to provide more than an indication of the indication duration which can be achieved under similar circumstances:

Ethyl decanoate:3 days
Propyl decanoate:4 days
Isobutyl decanoate:12 days
n-Butyl decanoate:14 days
Isoamyl decanoate:14 days
Methyl undecanoate:3 days
Ethyl undecanoate:5 days
Isoamyl undecanoate:10 days
Phenylethyl undecanoate:>90 days
Ethyl dodecanoate:>90 days
Ethyl tridecanoate:>90 days
Ethyl pentadecanoate:>90 days
Undecane:<1 day
Dodecane:<1 day
Tridecane:<1 day
Tetradecane:1 day
Pentadecene:4 days
Hexadecene:8 days

EXAMPLE III

Three indicators were manufactured by sticking red-colored paper of type "Normacolor 022.200" made by Mecanorma, France over the reverse side of small white sheets of porous polypropylene film described in Example I, area 25 cm$^2$. The paper was sprayed beforehand with varnish of the type "Protecting Spray 16" made by Talnes, a varnish based on acrylate resins.

The carriers manufactured in this way were impregnated with 0.5, 0.6 and 0.7 respectively of isobornyl acetate, as a result of which the colour of the indicator changed from white to red. The impregnated carriers were covered with film A from Example I.

The indication duration and the rate of change was determined at 21° C. and a relative humidity of 45%. The range of change (the time duration between the beginning of detectable colour change and complete change) varied from 3 days for 0.5 g of liquid to 4 days with 0.7 g of liquid. Complete colour change to white was reached after 16 days with 0.5 g, after 25 days with 0.6 g, and after 35 days with 0.7 g. After complete colour change approximately 0.35 g of liquid proved to be present in all 3 indicators so that approximately 0.15, 0.25 and 0.35 g, respectively, of liquid were available for evaporation. As appears from the results, in the indicator system described here, approximately 0.1 g of liquid more than the residual quantity is required for each 10 days of indication duration if isobornyl acetate is used as the volatile liquid.

I claim:
1. A time duration indicator, which comprises
   a layer of a porous inert carrier material having two major surfaces, that is substantially opague when dry,
   a colorless, volatile liquid impregnated in the carrier material and selected such that the carrier material becomes transparent or translucent when impregnated with the liquid, the liquid being capable of evaporating from the carrier material, and
   an inert layer attached to one major surface of the carrier material, the inert layer having a color different from that of the carrier material, wherein the inert layer can be seen through the carrier material when the carrier material is impregnated with the liquid, and the inert layer cannot be seen through the carrier material when substantially all of the liquid has evaporated from the carrier material, the amount and volatility of the liquid being chosen such that, on expiration of a specified amount of time, the carrier material conceals the inert layer.

2. The time duration indicator according to claim 1, wherein the carrier material is selected from the group consisting of paper, textiles, felt-type materials, porous non-transparent polymers, porous ceramic materials, pressed powders, bonded powders, and sintered powders.

3. The time duration indicator according to claim 1, wherein the porous inert carrier material is a porous non-transparent polymer.

4. The time duration indicator according to claim 1, wherein the inert layer is transparent.

5. The time duration indicator according to claim 1, wherein the inert layer is translucent.

6. The time duration indicator according to claim 1, wherein the inert layer is made of fluorescent material.

7. The time duration indicator according to claim 1, wherein the inert layer is made of reflecting material.

8. The time duration indicator according to claim 1, wherein the surface of the carrier material opposite to the inert layer is convered by a film, the film being at least partially transparent and permeable to the liquid.

9. The time duration indicator according to claim 1, wherein the surface of the carrier material opposite to the inert layer is covered by a film, the film being removeable and non-permeable to the liquid.

10. The time duration indicator according to claim 1 further comprising a reservoir containing the liquid, the reservoir being in contact with the carrier material.

* * * * *